(12) United States Patent
Gottumukkal et al.

(10) Patent No.: US 10,643,078 B2
(45) Date of Patent: May 5, 2020

(54) AUTOMATIC CAMERA GROUND PLANE CALIBRATION METHOD AND SYSTEM

(71) Applicant: Sensormatic Electronics, LLC, Boca Raton, FL (US)

(72) Inventors: Rajkiran Kumar Gottumukkal, Bangalore (IN); Ian C. Westmacott, Tewksbury, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 275 days.

(21) Appl. No.: 15/803,988

(22) Filed: Nov. 6, 2017

(65) Prior Publication Data

US 2019/0138818 A1  May 9, 2019

(51) Int. Cl.
| | |
|---|---|
| *G06K 9/00* | (2006.01) |
| *G06K 9/66* | (2006.01) |
| *G06T 7/246* | (2017.01) |
| *G06T 7/194* | (2017.01) |
| *G06T 7/62* | (2017.01) |
| *G06T 7/50* | (2017.01) |
| *G06T 7/80* | (2017.01) |
| *G06K 9/46* | (2006.01) |

(52) U.S. Cl.
CPC ....... *G06K 9/00771* (2013.01); *G06K 9/4638* (2013.01); *G06K 9/66* (2013.01); *G06T 7/194* (2017.01); *G06T 7/251* (2017.01); *G06T 7/50* (2017.01); *G06T 7/62* (2017.01); *G06T 7/80* (2017.01); *G06T 2207/10016* (2013.01); *G06T 2207/10028* (2013.01); *G06T 2207/20081* (2013.01); *G06T 2207/30232* (2013.01)

(58) Field of Classification Search
CPC . G06T 2207/30232; G06T 2207/10016; G06T 2207/10028; G06T 2207/20081; G06T 7/194; G06T 7/251; G06T 7/50; G06T 7/62; G06T 7/80; G06K 9/00771
See application file for complete search history.

(56) References Cited

U.S. PATENT DOCUMENTS

| | | | |
|---|---|---|---|
| 8,649,594 B1* | 2/2014 | Hua | G06K 9/00771 |
| | | | 348/143 |
| 2010/0103266 A1* | 4/2010 | Merkel | G06T 7/80 |
| | | | 348/155 |
| 2011/0149041 A1 | 6/2011 | Eccles et al. | |
| 2011/0255748 A1* | 10/2011 | Komoto | G06K 9/00335 |
| | | | 382/103 |
| 2012/0327220 A1* | 12/2012 | Ma | H04N 5/232 |
| | | | 348/135 |

(Continued)

OTHER PUBLICATIONS

Ashutosh Saxena, Min Sun, and Andrew Y. Ng .; "Make3D: Learning 3D Scene Structure from a Single Still Image"; IEEE, May 2009.*

(Continued)

*Primary Examiner* — Shaghayegh Azima
(74) *Attorney, Agent, or Firm* — HoustonHogle LLP

(57) ABSTRACT

A surveillance camera system and method is disclosed. The system includes one or more surveillance cameras that capture images of scenes, and one or more calibration systems that automatically generate ground planes from the captured images from the surveillance cameras. Foreground objects in the scenes are then analyzed against the ground planes to determine whether the ground planes may require updating and/or recalculation.

17 Claims, 13 Drawing Sheets

(56) References Cited

U.S. PATENT DOCUMENTS

| | | | |
|---|---|---|---|
| 2013/0169822 A1* | 7/2013 | Zhu | G06T 7/80 |
| | | | 348/180 |
| 2014/0152810 A1* | 6/2014 | Bae | G01C 3/12 |
| | | | 348/135 |
| 2015/0043777 A1* | 2/2015 | Tsai | G06K 9/00771 |
| | | | 382/103 |
| 2016/0350921 A1* | 12/2016 | Bataller | G06T 7/80 |
| 2017/0109613 A1* | 4/2017 | Kolavennu | G06K 9/00771 |
| 2017/0257573 A1* | 9/2017 | Abe | G06T 7/215 |
| 2017/0302860 A1* | 10/2017 | Yokomizo | G06T 7/74 |

OTHER PUBLICATIONS

Saxena, A., et al., "Make3D: Learning 3D Scene Structure from a Single Still Image," IEEE Trans. Pattern Anal. Mach. Intell. 31(5): 1-16 (2009).

* cited by examiner

AUTOMATIC CAMERA GROUND PLANE CALIBRATION METHOD AND SYSTEM

BACKGROUND OF THE INVENTION

Surveillance camera systems are used to help protect people, property, and reduce crime for homeowners, governments, and businesses alike and have become an increasingly cost-effective tool to reduce risk. They can be used to monitor buildings and rooms within buildings. The camera systems can also be used to monitor public areas such as parks or public spaces in and around buildings. In some cases, they are used to catch illegal activity. In other cases, they are used to monitor usage such as shopping patterns in a retail store or traffic levels on public roadways, or detect events that would require the intervention of emergency response personnel.

These camera systems include surveillance cameras, video management systems, and video analytics systems. The surveillance cameras capture images of scenes using imagers such as charge coupled devices (CCDs) or CMOS devices that capture light of a scene and convert the light to electrical signals, and frame capture systems that convert the signals to 2D image data of the scenes. The video management systems communicate with the surveillance cameras over a network, store the images for each of the surveillance cameras, and also distribute the image data to workstations or mobile computing devices for users. The video analytics systems detect and track objects within the scenes, and can notify operators when events associated with the objects occur within the scenes. The video analytics systems can be part of the video management system, or can reside within the individual surveillance cameras, in examples.

The video analytics systems will define a background model of the scenes for each of the surveillance cameras. A background model represents the stationary portion of the scene and generally includes static elements and/or predicted images within the scene. The analytics system computes an average of pixels in multiple scenes over time in order to generate an image of the scene that does not change or changes only very slowly. This time-averaged image of the scene is then used as the background model.

The analytics system then detects and tracks foreground objects against that model. The analytics system uses an object detection and tracking system to detect and track foreground objects such as people and cars within scenes over time, and saves information associated with the detection and tracking as metadata. In one example, people are tracked as they interact with a zone around a door, where the door is defined as part of the model, in one specific example. Analytics systems can provide both live monitoring of individuals and objects, and forensic analysis of saved images to spot trends and search for specific behaviors of interest.

Ground planes are sometimes used to characterize the scenes. A ground plane is generally a 2D surface within a scene that is set at the level of the floor or ground. The ground plane provides perspective via its edges that are parallel to the line of sight. The edges begin at a point near the front of the scene, and converge at the vanishing point on the horizon. Points at the front of the scene form a picture plane, where the picture plane is perpendicular to the axis of the line of sight. The ground plane also typically includes range information. The range information is typically indicated with iso-distance contours that extend transversely across the scene, and are perpendicular to the ground plane's edges.

The foreground objects can be analyzed with respect to the ground plane. The analytics system overlays the foreground objects upon the ground planes to determine intersections between the foreground objects and the ground planes. The points of intersection between the foreground objects and the ground planes can be used to determine the range of the foreground objects. The analytics systems use algorithms to determine sizes or heights of the foreground objects in pixels, and then convert the pixel sizes to an estimate of the actual sizes or heights using the range information of the objects.

These ground planes are typically identified as part of a calibration process. One calibration process uses additional hardware connected to the surveillance cameras to manually define the ground planes. For this purpose, hardware such as a computer system including an interactive computer monitor is typically used. The computer system receives an image of the scene for each surveillance camera and displays the image on the monitor. The operator then uses software provided by the computer system to "draw" an overlay region or virtual area upon the image, which defines the ground plane. The computer system then creates the ground plane from the pixels enclosed by the user-defined region. The computer system repeats this calibration process for each of the surveillance cameras. A second calibration process requires that operators measure the height and locations of one or more reference objects in the scenes for each of the surveillance cameras. The operator then provides this information as input to the calibration process, which creates the ground planes in response.

SUMMARY OF THE INVENTION

A problem with many existing surveillance camera systems is that their ground planes must be manually configured. This adds complexity and cost. The process of measuring sizes of reference objects in the scene to define the ground planes is tedious and error-prone. Moreover, these steps must be repeated for each of the surveillance cameras and each time a given surveillance camera's field of view changes due to pan, tilt or zoom.

In contrast, the proposed approach can automatically create ground planes for each of the surveillance cameras. The ground planes are automatically generated from the captured images from the surveillance cameras. In one example, a calibration system automatically generates the ground planes by first loading trained weights from a machine learning algorithm, and executing the trained weights against one or more of the captured images. As a result of this operation, depth images for the captured images are obtained. Depth images estimate a depth or range associated with each of the pixels or groups of pixels within the captured images. The calibration system then creates the ground planes from the captured images and from the depth images for the captured images.

In addition, the proposed approach can further assess these created ground planes for errors. The calibration system continuously analyzes the foreground objects to determine ambiguities in the foreground objects. The ambiguities may suggest errors in the ground plane. Based upon the determined ambiguities, the calibration system can then automatically update the ground planes in response. Examples of ambiguities in foreground objects that may indicate errors in the ground plane include: estimated heights of foreground objects that do not agree with accepted heights for the class or type of the objects; and when estimated heights or sizes of the foreground objects change as the objects move across the scene with uniform depth, in examples.

In general, according to one aspect, the invention features a surveillance camera system. The system includes one or more surveillance cameras that capture images of scenes, and one or more calibration systems that automatically generate ground planes from the captured images from the surveillance cameras.

The calibration system can include a calibrator module that automatically generates the ground planes from the captured images. The calibrator module might automatically generate the ground planes from the captured images by executing trained weights of a machine learning algorithm against one or more of the captured images to obtain depth images for the captured images, and by creating the ground planes from the captured images and the depth images for the captured images. The depth images estimate depth of the image for pixels within the captured images.

Preferably, the calibration system includes an ambiguity detector module. Typically, the ambiguity detector module compares foreground objects against the ground planes to determine ranges and estimated heights or sizes of the foreground objects, detects ambiguities in the foreground objects that suggest errors in the ground planes, based upon the ranges and the estimated heights or sizes of the foreground objects, and determines whether to update the ground planes based upon the determined ambiguities in the foreground objects.

In one example, the ambiguity detector module can conclude that there are ambiguities in the foreground objects when the estimated heights or sizes of the foreground objects change as the foreground objects move across the scene. In another example, the ambiguity detector module can conclude ambiguities in the foreground objects when estimated heights of the foreground objects are determined to be larger or smaller than expected.

Preferably, the surveillance camera system also includes a video analytics system. The video analytics system has an object detection and tracking system that tracks foreground objects within the scenes. The object detection and tracking system generates object tracking information, object classification information, and/or object size information for each of the foreground objects.

The calibration systems can determine whether ambiguities in the foreground objects exist relative to the ground planes, where the ambiguities in the foreground objects suggest errors in the ground planes. The calibration systems can then modify the ground planes to address the errors in the ground planes with reference to the object tracking information, object classification information, and/or object size information for the foreground objects found to have ambiguities.

Typically, the calibration systems modify the ground planes with reference to bounding boxes and trajectory information of the object tracking information for the foreground objects found to have ambiguities.

In one example, the calibration systems modify the ground planes by moving the ground planes up and/or down relative to a Y axis of the ground planes. In other examples, the calibration systems modify the ground planes by rotating the ground planes around an X and/or a Z axis of the ground planes.

In general, according to another aspect, the invention features a method for configuring a surveillance camera system. The method comprises one or more surveillance cameras capturing images of scenes, and automatically generating ground planes from the captured images from the surveillance cameras.

The method further comprises training a machine learning algorithm with reference 2D images and corresponding ground truth depth image information, prior to executing trained weights of the machine learning algorithm against the one or more of the captured images. The method can further determine ambiguities in foreground objects relative to the ground planes.

Additionally and/or optionally, the method further comprises updating the ground planes in response to determining that background models of the scenes have changed.

Additionally and/or optionally, the method further comprises creating new ground planes in response to determining that fields of view of the surveillance cameras has changed.

In general, according to yet another aspect, the invention features a surveillance camera. The surveillance camera includes local storage of images captured by the surveillance camera, and a calibration system that automatically generates a ground plane from the captured images.

In general, according to yet another aspect, the invention features a surveillance camera system. The surveillance camera system includes one or more surveillance cameras that capture images of scenes, and an ambiguity detector module. The ambiguity detector module compares foreground objects against ground planes to determine ranges and estimated heights or sizes of the foreground objects, detects ambiguities in the foreground objects that suggest errors in the ground planes, based upon the ranges and the estimated heights or sizes of the foreground objects, and determines whether to update the ground planes based upon the determined ambiguities in the foreground objects.

In general, according to still another aspect, the invention features a method for a surveillance camera system. The method comprises one or more surveillance cameras capturing images of scenes, generating ground planes from the captured images from the surveillance cameras; and determining ambiguities in foreground objects relative to the ground planes.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
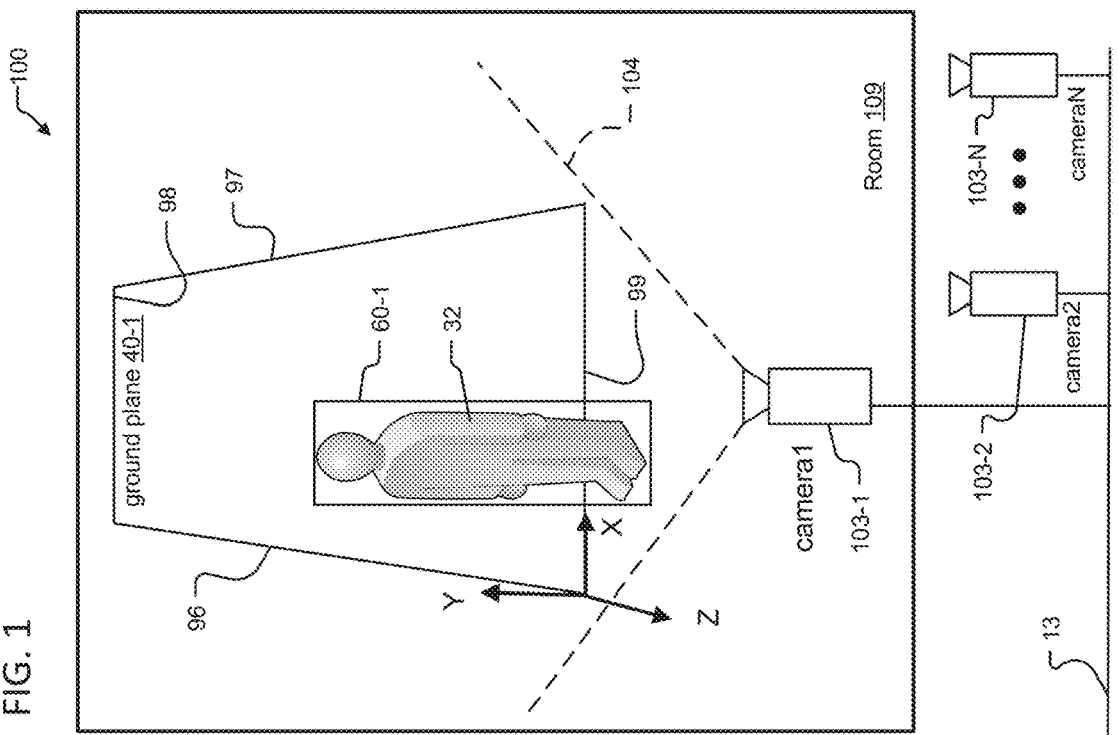
FIG. 1 is a schematic diagram showing an embodiment of an inventive surveillance camera system ("system") including a video management system, where the video management system includes components such as a calibration system and a video analytics system, and where the video management system provides storage for and distributes the captured images from each of the surveillance cameras.
Figure 1:
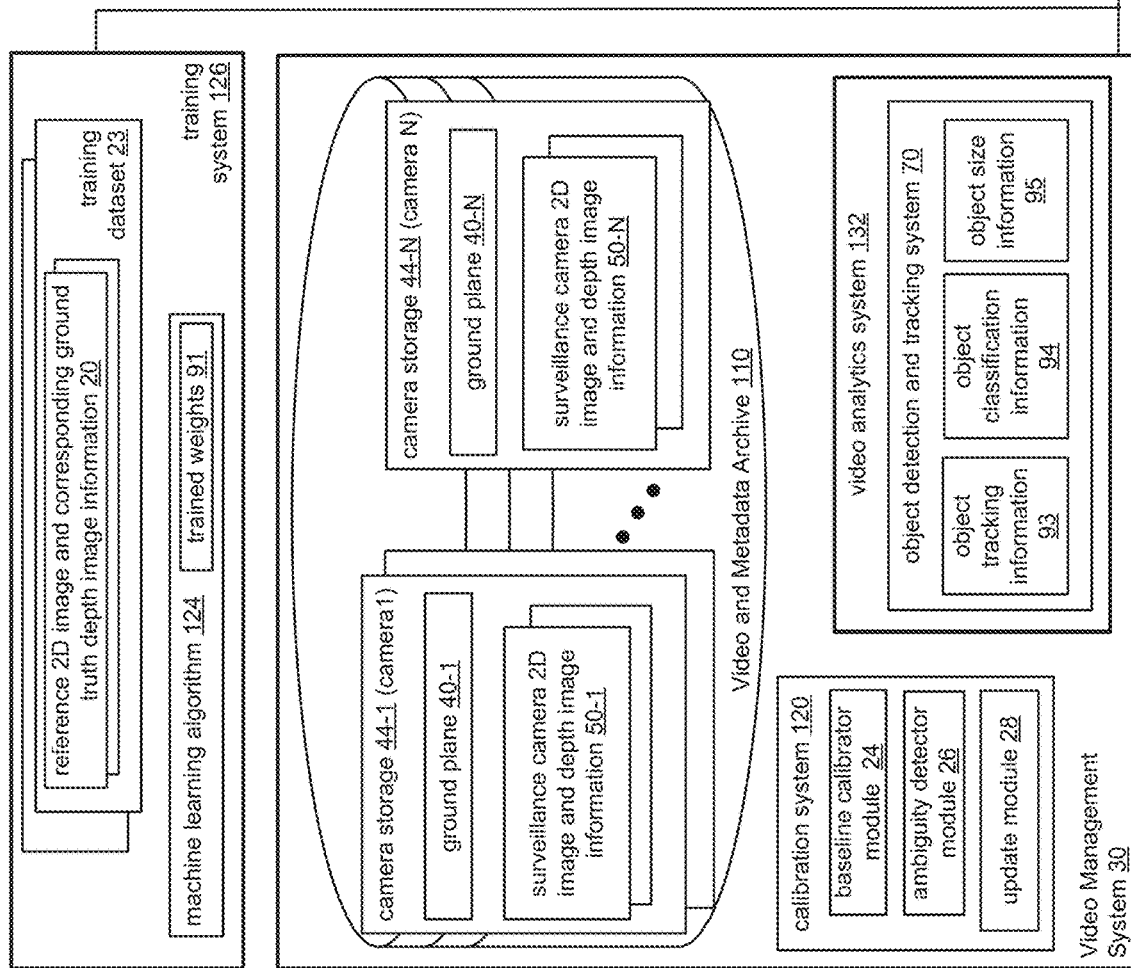

FIG. 1 shows an embodiment of a surveillance camera system 100 ("system") to which the invention is directed. Illustration of a ground plane 40-1 for an exemplary surveillance camera 103-1 is also shown.

The system 100 includes one or more surveillance cameras 103-1 through 103-N, a training system 126, and a video management system 30. The video management system 30 might be located remotely from the one or more surveillance cameras 103-1 through 103-N. Surveillance cameras 103-1 through 103-N also have labels "camera 1," "camera 2," and "camera N," respectfully. The surveillance cameras 103-1 through 103-N communicate with the video management system 30 over a network 13. The surveillance cameras 103 capture 2D images of three-dimensional scenes. The 2D images are typically represented as two-dimensional arrays of pixel data. The training system 124 also communicates with the video management system 30 over the network 13.

The video management system 30 includes a calibration system 120, a video analytics system 132, and a video and metadata archive 110. The archive 110 stores images captured from the surveillance cameras 103 and other information for the cameras 103. The archive 110 stores this information via separate instances of camera storage 44-1 through 44-N for each of the surveillance cameras 103-1 through 103-N. In one implementation, the archive 110 is a database and each instance of camera storage 44 is a separate record in the archive 110.

The training system 126 includes one or more training datasets 23 and at least one machine learning algorithm 124. Each training dataset 23 includes one or more instances of reference 2D image and corresponding ground truth depth information 20. The machine learning algorithm 124 provides trained weights 91 for subsequent use by the calibration system 120.

For each surveillance camera 103, an associated instance of camera storage 44 stores information for a ground plane 40 and one or more instances of surveillance camera 2D image and depth information 50 for the surveillance camera 103. For surveillance camera1/103-1, for example, the system 100 stores an instance of camera storage 44-1 that includes a ground plane 40-1 and one or more instances of surveillance camera 2D image and depth information 50-1. In one implementation, the ground plane 40 within each record of camera storage 44 includes a pointer to an instance of stored surveillance camera 2D image and depth image information 50.

The calibration system 120 includes a baseline calibration module 24, an ambiguity detector module 26, and an update module 28. The video analytics system 132 includes an object detection and tracking system 70. For each surveillance camera 103, the object detection and tracking system 70 detects, tracks, classifies, and analyzes foreground objects 60 in images of scenes for each surveillance camera 103. The object detection and tracking system 70 generates and stores object tracking information 93, object classification information 94, and object size information 95 for each of the foreground objects 60. The object tracking information 93 for each foreground object 60 includes a bounding box and trajectory information for tracking each object 60 as it moves across the scene.

In the illustrated example, surveillance camera 103-1 is positioned within a room 109 of a building. The surveillance camera 103-1 is positioned to capture images of a scene within the room 109. The scene is included within a field of view 104 of the surveillance camera 103-1. The ground plane 40-1 is generated from captured images from the surveillance camera 103-1, such as from the surveillance camera 2D image and depth image information 50-1. The generated ground plane 40-1 is shown within the scene.

A front end 99 of the ground plane 40-1 is located near a foreground portion of the scene, and a back end 98 of the ground plane 40-1 is located at a point in the scene that is further away from the surveillance camera 103-1. A left edge 96 and right edge 97 of the ground plane 40-1 is also shown. Foreground object 60-1, a person 32, is included within the scene of surveillance camera 103-1.

Pixels associated with the person 32 in the image of the scene are located near the front end 99 of the ground plane 40-1. A majority of pixels associated with the person 32 are "included" within the ground plane 40-1, and a small portion of the pixels associated with the person 32 are located outside the front end 99.

Figure 2:
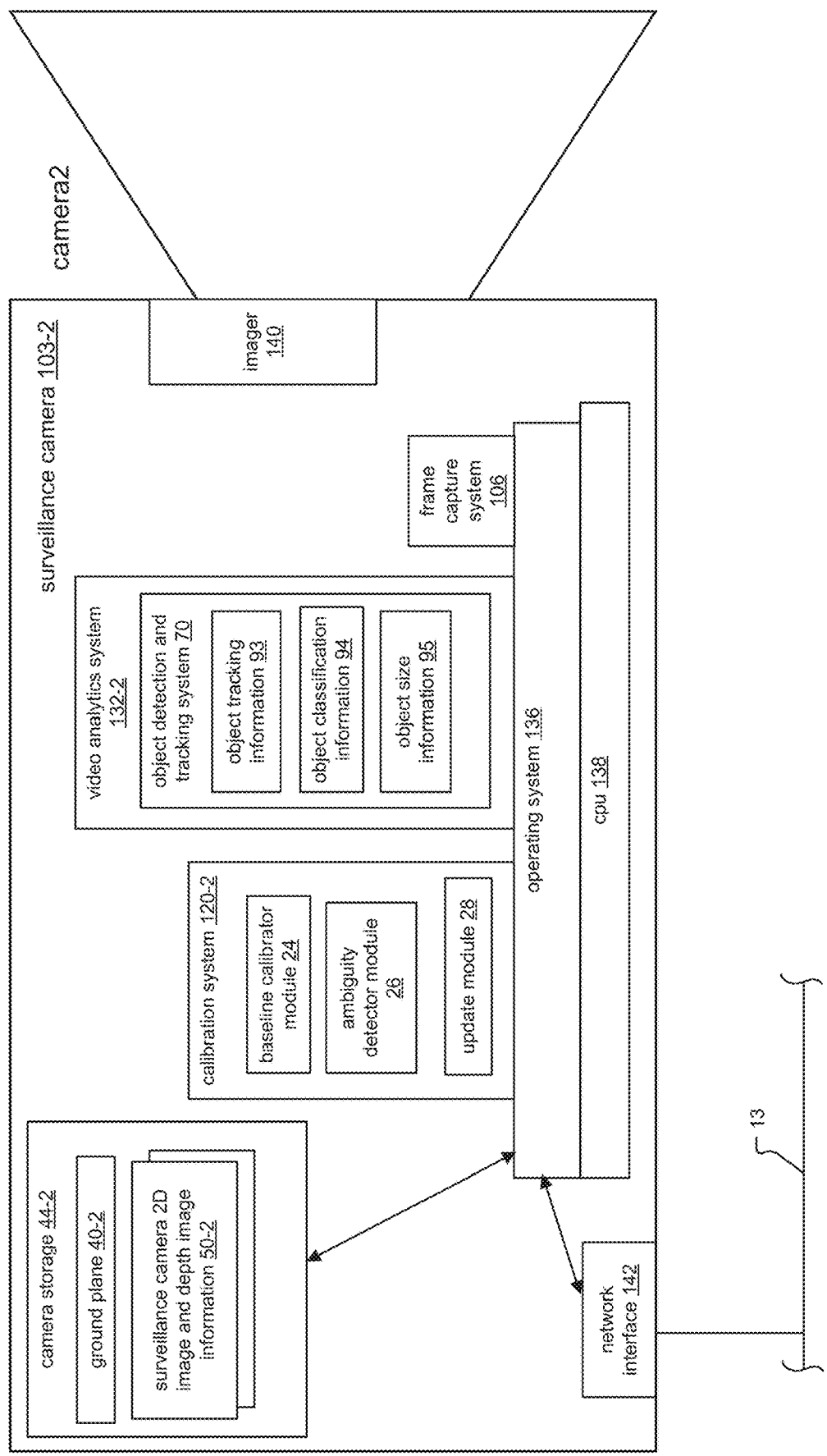
FIG. 2 is a schematic diagram showing more detail of an inventive surveillance camera system, where the storage of the captured images, the calibration system, and the video analytics system are incorporated within the surveillance camera.

FIG. 2 shows detail for another embodiment of the system 100. Unlike the embodiment of FIG. 1, the camera storage 44, calibration system 120, and video analytics system 132 are incorporated within exemplary surveillance camera 103-2 in FIG. 2.

In more detail, surveillance camera 103-2 includes camera storage 44-2, calibration system 120-2, video analytics system 132-2, frame capture system 106, imager 140, operating system 136, central processing unit (CPU) 138, and network interface 142.

In the illustrated example, the calibration system 120-2, the video analytics system 132-2, and the frame capture system 106 are software processes that execute on top of the operating system 136 of surveillance camera 103-2. The operating system 136, in turn, executes on top of the CPU 138. The operating system 136 communicates over the network 13 via network interface 142. The operating system 136 also interfaces with camera storage 44-2.

The frame capture system 106 captures images provided by the imager 140 and stores the images to surveillance camera 2D image and depth information 50-2 of the camera storage 44-2. The calibration system 120-2 generates ground plane 40-2 and stores information associated with ground plane 40-2 to camera storage 44-2.

Figure 3A:
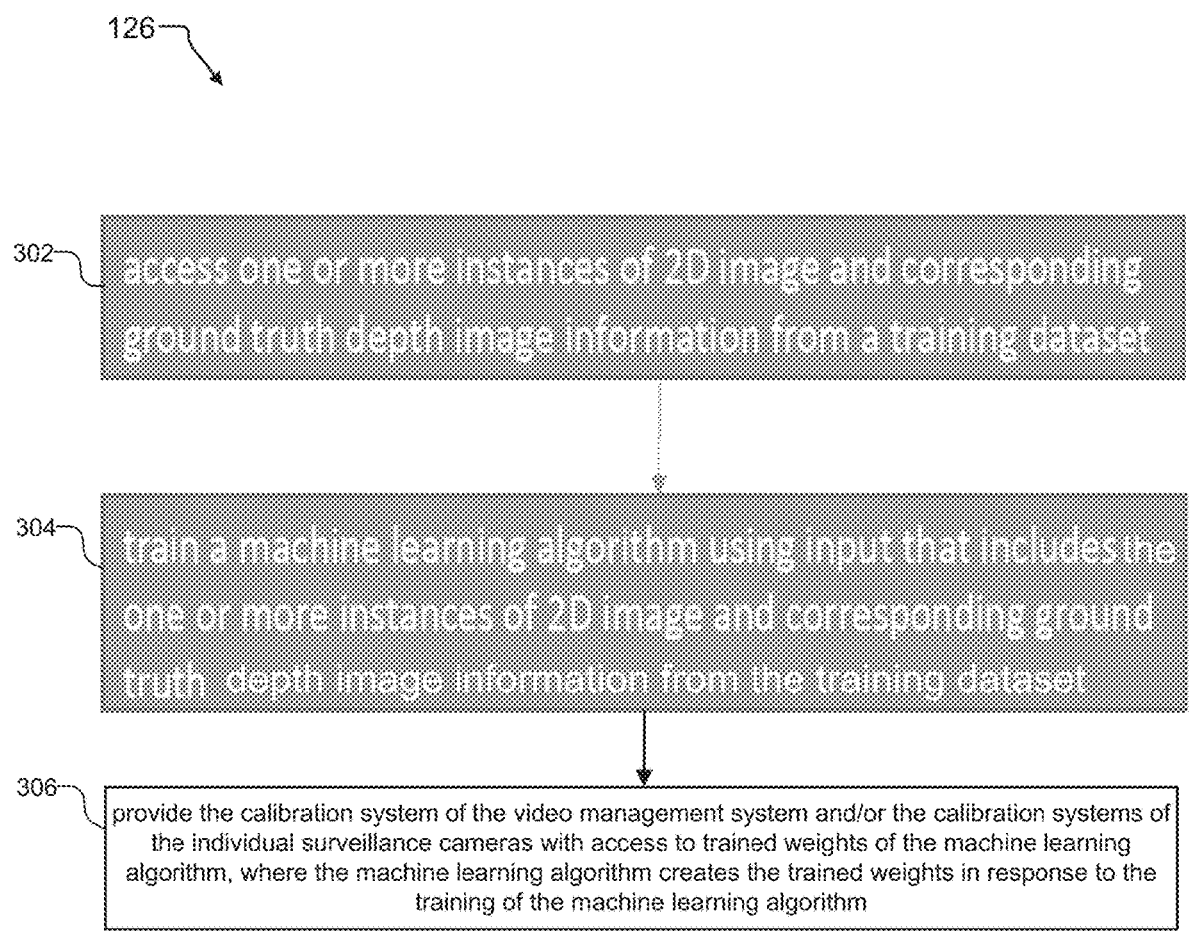
FIG. 3A is a flow chart illustrating a method for a training system, where the method trains a machine learning algorithm to provide trained weights for subsequent usage by the calibration system.

FIG. 3A shows how the training system 126 trains a machine learning algorithm 124. The training system 126 trains the machine learning algorithm 124 for subsequent use by the calibration system 120 in FIGS. 1 and 2.

Typically, the training system 126 is separate from/located externally to the video management system 30 and the surveillance cameras 103. The training system 126 is a computer system such as an enterprise mainframe computer, computer workstation, laptop or mobile device, in examples. The training system 126 includes a central processing unit, memory, an operating system, and one or more applications which execute on top of the operating system.

In step 302, the training system 126 accesses one or more instances of reference 2D image and corresponding ground truth depth image information 20 from a training dataset 23. The 2D images within the reference 2D image and corresponding ground truth depth image information 20 were either obtained from the video management system 30, or were generated by the integrated frame capture system 106 of a surveillance camera 103, depending on the embodiment. A depth image is "paired" to an associated 2D image, where the depth image estimates the depth at each pixel of its associated 2D image. The depth image, in one example, provides a measure of the distance between the background objects within the 2D image and the surveillance camera 103 which captured the 2D image. In another example, the depth image provides a measure of the distance between points on the ground plane 40 and the surveillance camera 103.

In step 304, the training system 126 trains the machine learning algorithm 124 using input that includes the one or more instances of the reference 2D image and corresponding ground truth depth image information 20 from the training dataset 23. In one example, the machine learning algorithm 124 is a Markov Random Fields (MRF) algorithm. Alternatively, the machine learning algorithm 124 is "pre-trained," and therefore step 304 is not necessary. Upon completion of step 304, the machine learning algorithm 124 creates trained weights 91 in response.

According to step 306, the training system 126 provides the calibration system 20 of the video management system 30 and/or the calibration systems 120 of the individual surveillance cameras 103 with access to the trained weights 91. In one example, the training system 126 enables external access to the trained weights 91 via a software application programming interface (API).

In another implementation, different sets of trained weights 91 can be created for individual cameras 103 and/or groups of cameras 103. The training method of FIG. 3A is then executed upon the training datasets 23 to create camera-specific or group-specific trained weights 91. Examples of group-specific trained weights 91 include those generated for indoor vs. outdoor cameras 103.

Figure 3B:
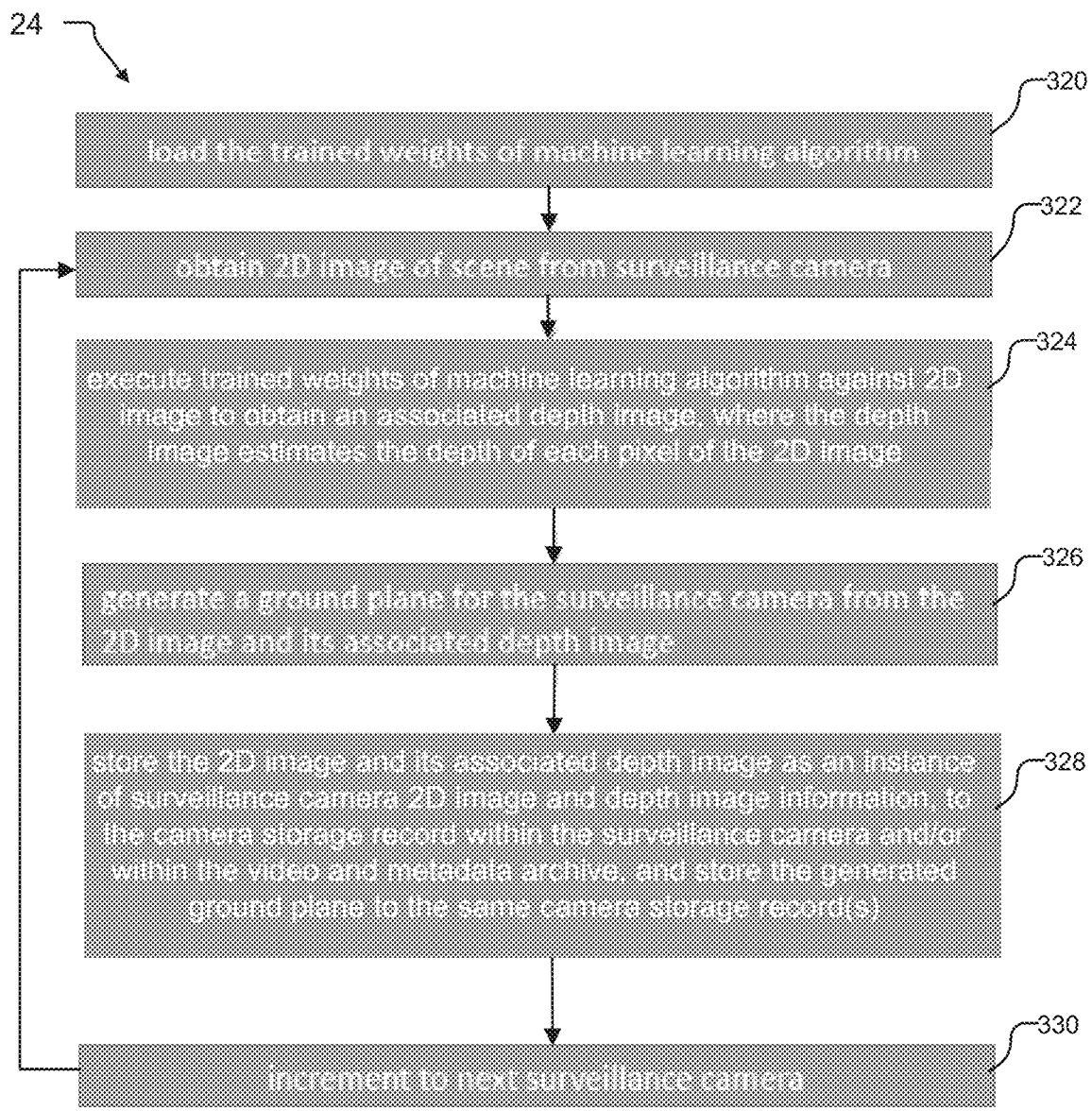
FIG. 3B is a flow chart that describes a method of operation for a baseline calibrator module of the calibration system, where the trained weights are used by the baseline calibrator module to automatically create a ground plane for each surveillance camera.

FIG. 3B describes a method of operation for the baseline calibrator module 24 of the calibration system 120. The baseline calibrator module 24 generates a ground plane 40 from the image data from one or more surveillance cameras 103.

In step 320, the baseline calibrator module 24 loads the trained weights 91 of the machine learning algorithm 124. The trained weights 91 loaded by the surveillance cameras 103 can apply to all cameras 103 in the system 100, can be camera-specific, or group-specific, in examples.

According to step 322, the baseline calibrator module 24 obtains a 2D image of the scene from the surveillance camera 103. Then, in step 324, the method executes the trained weights 91 against the 2D image to obtain an associated depth image, where the depth image estimates the depth at each pixel or group of pixels of the 2D image.

In step 326, the baseline calibrator module 24 generates a ground plane 40 for the surveillance camera 103 from the 2D image and its associated depth image. The baseline calibrator module 24, in step 328, stores the 2D image and associated depth image used to create the ground plane 40 as an instance of surveillance camera 2D image and depth image information 50. The instance of surveillance camera 2D image and depth image information 50 is stored within the camera storage 44 for the surveillance camera 103. The baseline calibrator module 24 also stores the generated ground plane 40 to the camera storage 44. Additionally and/or alternatively, the baseline calibrator module 24 can overwrite older instances of surveillance camera 2D image and depth image information 50.

The method then increments to the next surveillance camera 103 in step 330, and control resumes at step 322 to obtain a 2D image of the scene for the next surveillance camera 103.

Figure 4A:
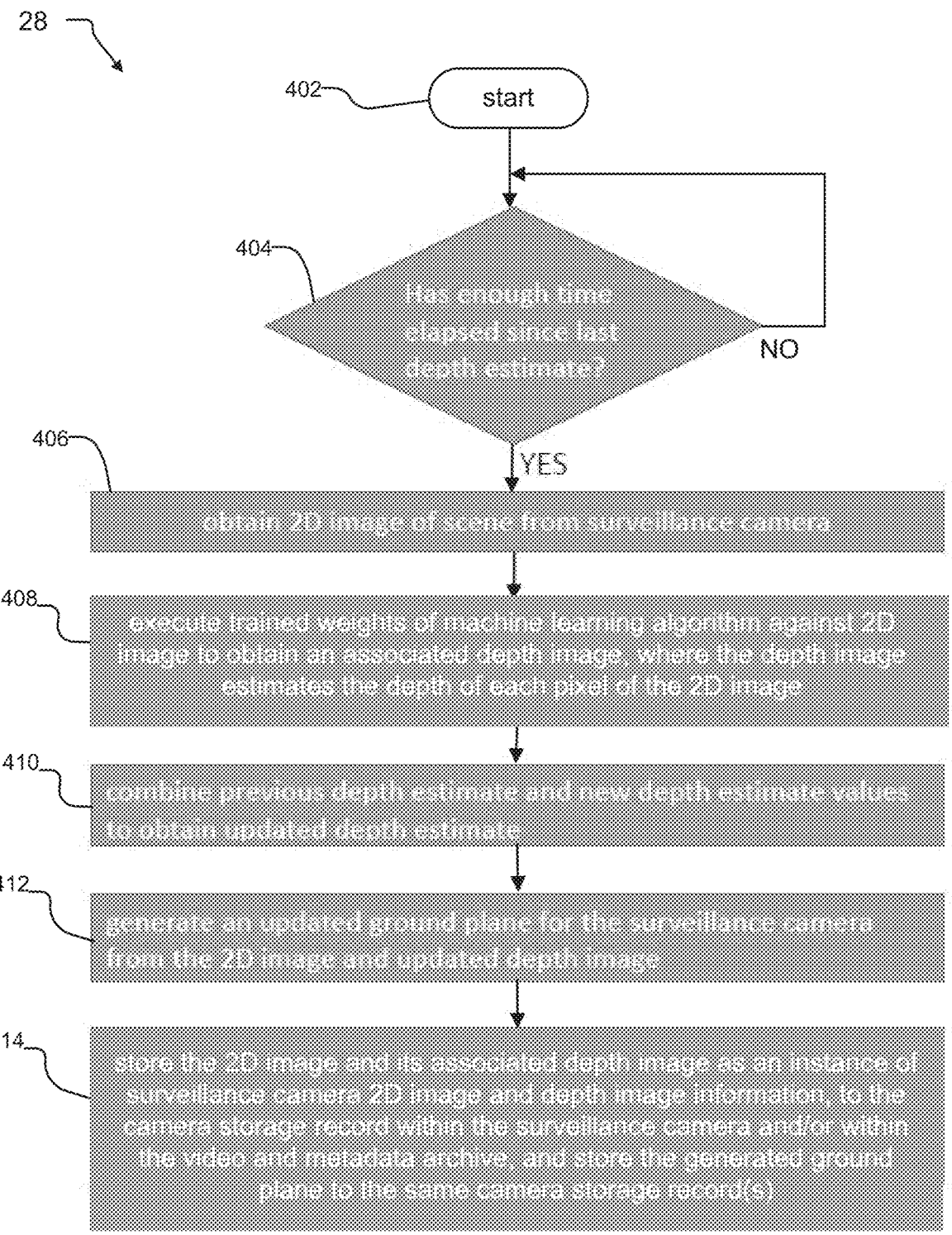
FIG. 4A is a flow chart that describes a method of operation for an update module of the calibration system, where the update module automatically generates an updated ground plane due to a change in the scene such as removal/displacement of a parked vehicle or furniture, based upon the time that has elapsed since creation/generation of the existing ground plane.

FIG. 4A describes a method of operation for the update module 28 of the calibration system 120 in FIGS. 1 and 2. Here, the update module 28 automatically generates updates to the depth estimate and ground plane 40 upon determining that an elapsed time since creation of the current ground plane 40 has exceeded a threshold value, and that the background model of the scene has changed over the elapsed time period. The method starts at step 402.

According to step 404, the update module 28 determines whether enough time has elapsed since calculation of the last depth estimate for creating the ground plane 40. Typically, the update module 28 automatically checks if updating of the ground plane 40 is required when this elapsed time has exceeded a threshold value, such as 30 minutes or two hours, in examples.

If the elapsed time exceeds the threshold value, the update module 28 analyzes the image data of the scene to determine whether the background model has changed. The update module 28 determines that the background model has changed due to detecting events such as removal/displacement of objects within the background model of the scene, in one example. Examples of objects within the background model include a parked vehicle and/or furniture. If the update module 28 determines that the background model has changed, the method transitions to step 406. Otherwise, if the elapsed time does not exceed the threshold value, or if the elapsed time exceeds the threshold value but no changes to the background model were found, no updates to the ground plane 40 are required. The method returns to step 404.

In step 406, the update module 28 obtains a 2D image of the scene from the surveillance camera 103. Then, in step 408, the method executes the trained weights 91 of the machine learning algorithm 124 against the 2D image to obtain an associated depth image. The depth image estimates the depth at each pixel or group of pixels of the 2D image.

In step 410, the update module 28 combines the previous depth estimate and new depth estimate values to obtain an updated depth estimate. For this purpose, values associated with the previously calculated depth image for generating the ground plane 40 are combined with values associated with the depth image calculated in step 408.

According to step 412, the update module 28 generates an updated ground plane 40 for the surveillance camera 103 from the 2D image and the updated depth image estimate calculated in step 410. In step 414, the update module 28 stores the 2D image and its associated depth image as an instance of surveillance camera 2D image and depth image information 50. The update module 28 stores the instance to the camera storage record 44 within the surveillance camera 103 and/or within the archive 110. The update module 28 also stores the ground plane 40 to the same camera storage record(s) 44 within the surveillance camera 103 and/or within the archive 110.

As a result, the update module 28 can automatically update the ground plane 40 for a surveillance camera 103 in response to determining that a background model of the scene has changed.

Figure 4B:
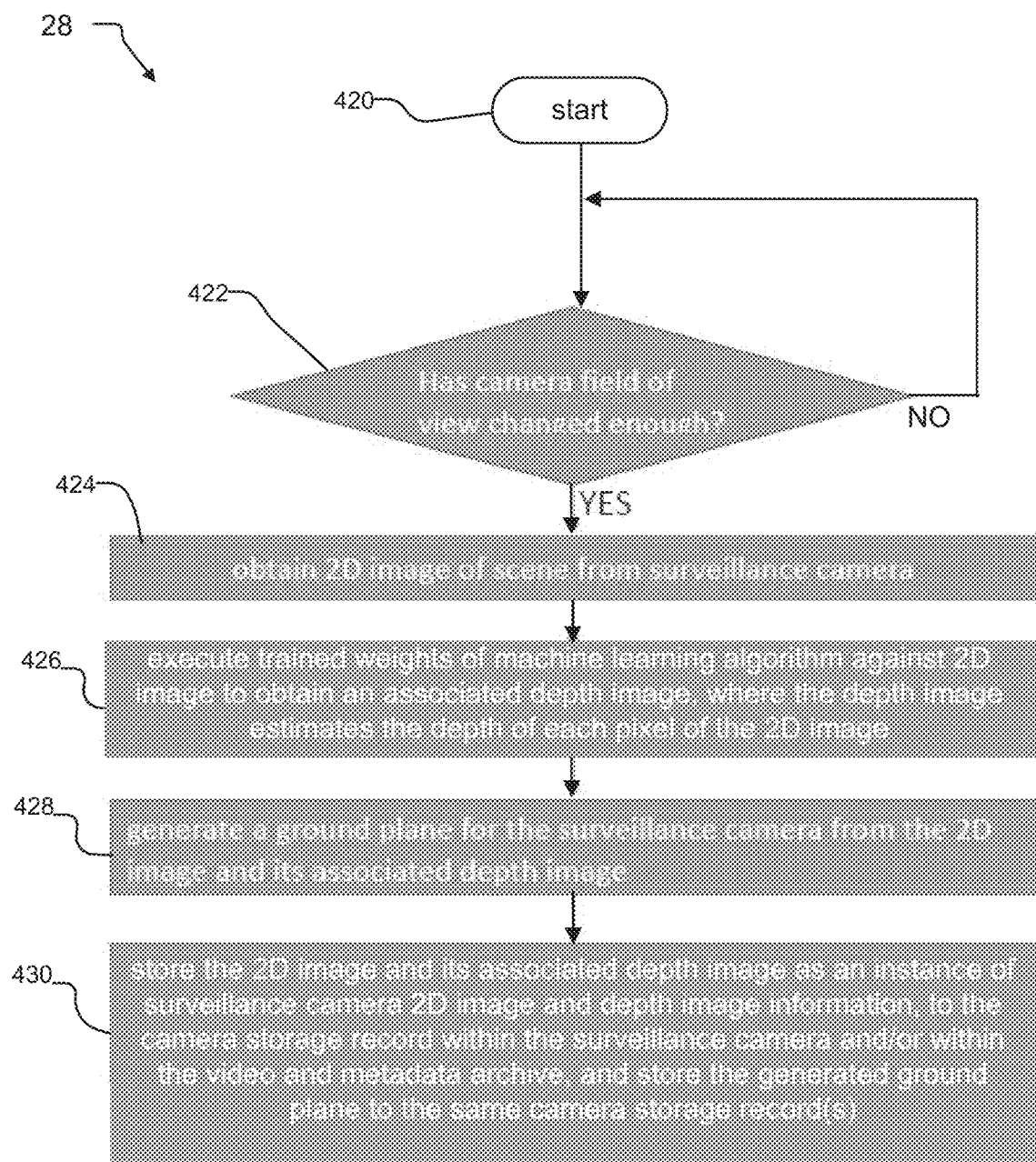
FIG. 4B is a flow chart that describes another method of operation for the update module, where the update module automatically generates new ground planes in response to changes in fields of view of the surveillance cameras.

FIG. 4B describes another method of operation for the update module 28. Here, the update module 28 creates a new ground plane 40 in response to a change to the field of view 104 of the surveillance camera 103. The method starts at step 420.

According to step 422, the update module 28 determines whether the field of view 104 has changed enough to require re-generation/creation of a new ground plane 40. The update module 28 typically receives a message indicating a change to the FOV from another software module of the camera 103. In one implementation, when the message indicates that the FOV 104 has changed beyond a threshold value, such as 2 degrees, the method transitions to step 424. Otherwise, no new ground planes are required and the method returns to step 422. In another implementation, any change in the FOV 104 triggers creation of a new depth image and new ground plane, and the method transitions to step 424 in response.

In step 424, the update module 28 obtains a 2D image of the scene from the surveillance camera 103. Then, in step 426, the method executes the trained weights 91 of the machine learning algorithm 124 against the 2D image to obtain an associated new depth image. The depth image estimates the depth at each pixel or group of pixels of the 2D image.

In step 428, the update module 28 generates a new ground plane 40 for the surveillance camera 103 from the 2D image and its associated depth image (estimate) calculated in step 426. In step 430, the update module 28 stores the 2D image and its associated depth image as an instance of surveillance camera 2D image and depth image information 50. The update module 28 stores the instance to the camera storage record 44 within the surveillance camera 103 and/or within the archive 110. The update module 28 also stores the ground plane 40 to the same camera storage record(s) 44 within the surveillance camera 103 and/or within the archive 110.

Figure 5A:
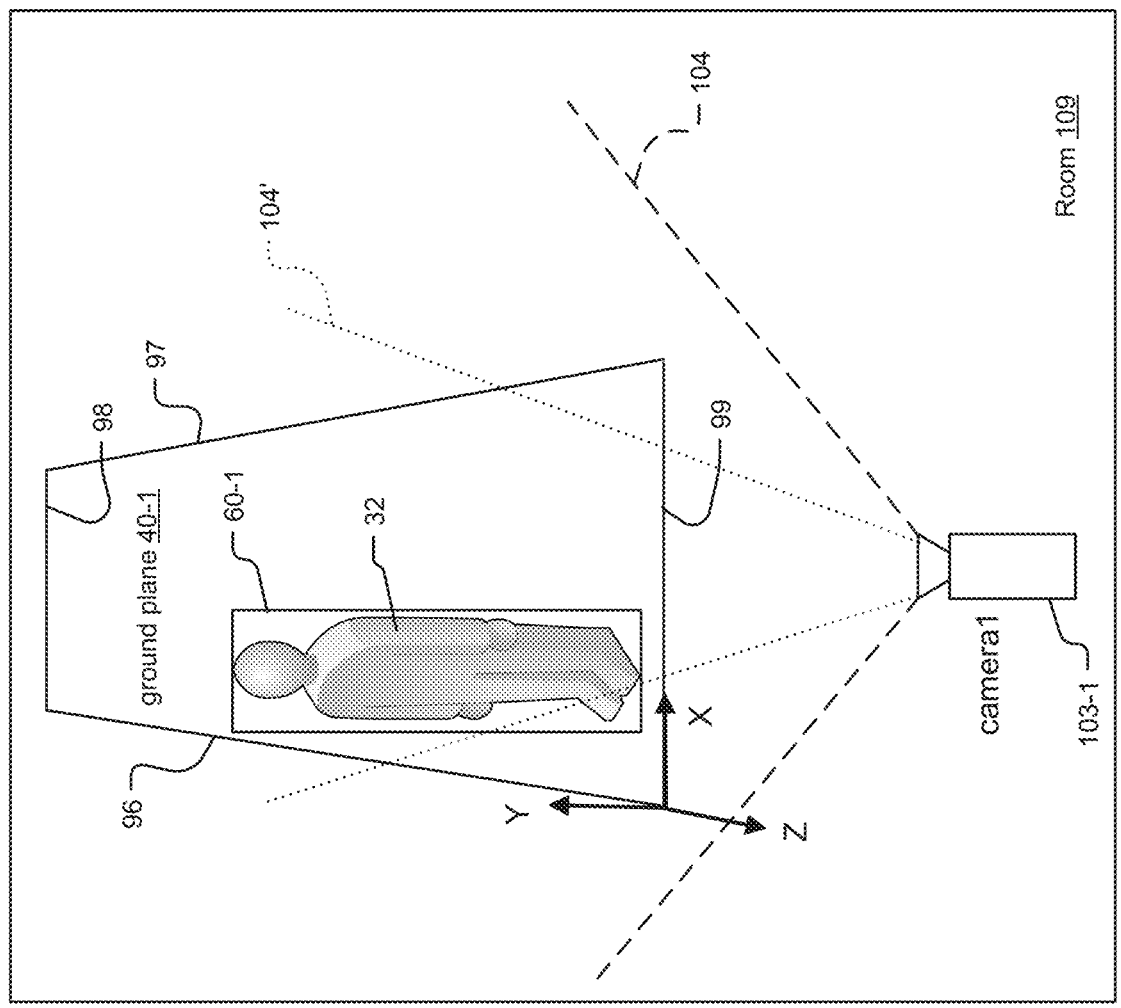
FIGS. 5A and 5B are schematic diagrams that illustrate different cases for generating new ground planes in accordance with the method of FIG. 4B, due to a change in field of view of a surveillance camera.

FIG. 5A illustrates a change to the existing field of view 104 of exemplary surveillance camera 103-1. A person 32 as a foreground object 60-1 is located entirely within ground plane 40-1 within a 2D image of a scene.

In the illustrated example, the existing field of view 104 has been narrowed to new field of view 104' as a result of a camera zoom operation. New field of view 104' includes most of the person 32, but not all of the person 32. In addition, not all of the ground plane 40-1 is located within the new field of view 104'. According to the method of FIG. 4B, the update module 28 generates a new ground plane 40 if the change to the FOV 104 exceeds a threshold value.

Figure 5B:
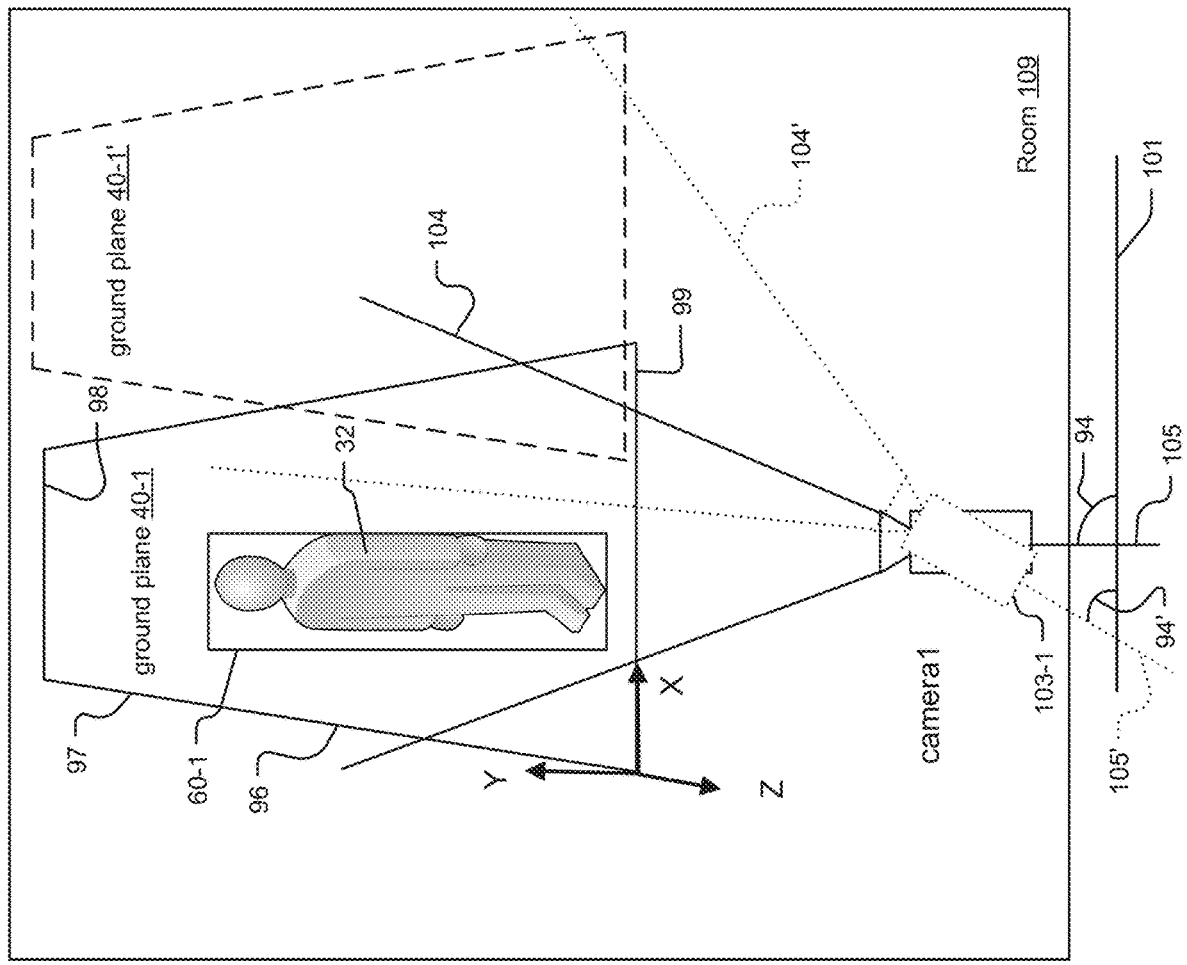

FIG. 5B illustrates a change to the existing tilt angle 94 of exemplary surveillance camera 103-1. This causes a change to the original FOV 104, resulting in new FOV 104'. As in FIG. 5A, person 32 as a foreground object 60-1 is located entirely within ground plane 40-1 within a 2D image of a scene.

In the illustrated example, an existing tilt angle 94 is measured between camera line of sight axis 105 and transverse reference line 101. The operator then moves the camera to new tilt angle 94', resulting in a new line of sight axis 105' and new field of view 104'. After this change, however, most of the ground plane 40-1 is no longer located within the new field of view 104' of the camera 103-1. According to the method of FIG. 4B, the update module 28 generates a new ground plane 40-1' if the change to the FOV 104 exceeds a threshold value, in one example. New ground plane 40-1' is now within the new field of view 104'.

Figure 6:
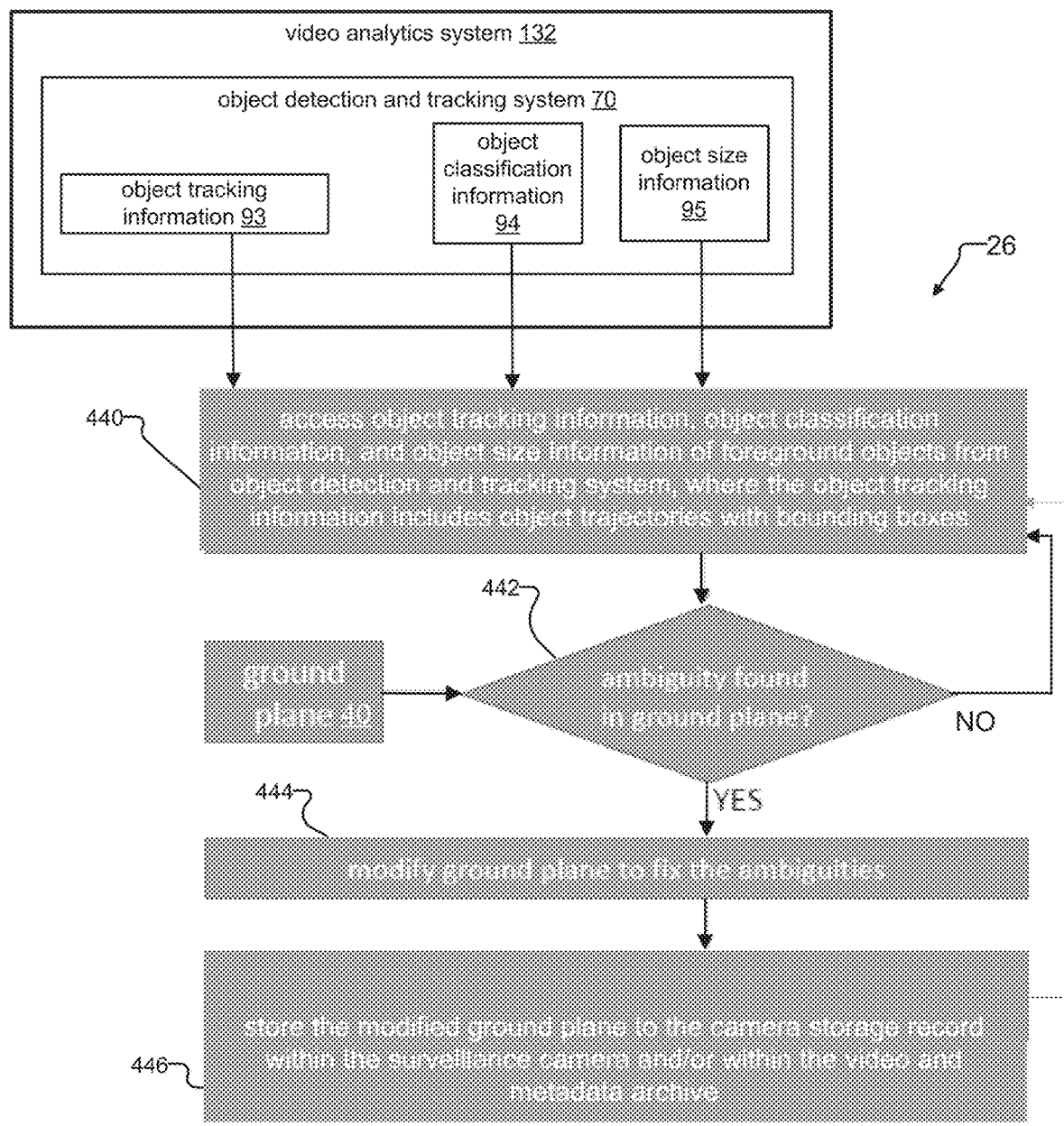
FIG. 6 is a flow chart that describes a method of operation for the ambiguity detector module of the calibration system in FIG. 1 or FIG. 2, where the ambiguity detector module determines whether ambiguities in foreground objects relative to the ground planes exist, and then modifies the ground planes to address errors in the ground planes suggested by the determined ambiguities.

FIG. 6 describes a method of operation for the ambiguity detector module 26 of the calibration system 120 in FIGS. 1 and 2. Here, the ambiguity detector module 26 determines whether ambiguities in foreground Objects 60 relative to a ground plane 40 exist. The ambiguities in the foreground objects 60 suggest errors in the ground plane 40. The ambiguity detector module 26 then modifies the ground plane 40 to address the errors in the ground plane 40 suggested by the ambiguities in the foreground objects 60.

In step 440, the ambiguity detector module 26 accesses the object tracking information 93, the object classification information 94, and the object size information 95 for each of the foreground objects 60 from the object detection and tracking system 70. The object tracking information 93 includes object trajectories with bounding boxes. In examples, the object classification information 94 can indicate the type of each foreground object 60. For example, a tracked object may be classified as a person 32 or automobile.

According to step 442, the ambiguity detector module 26 determines whether ambiguities in the foreground objects 60 relative to ground plane 60 exist.

To determine ambiguities in the foreground objects 60, the ambiguity detector module 26 compares the foreground objects 60 against the ground plane 40. The position of each foreground object 60 on the ground plane 40 can be determined from points of each object 60 that intersect with the ground plane 40. Using the position of each foreground object 60 on the ground plane 40, the ambiguity detector module 60 can then determine the range of or distance to each foreground object 60. The ambiguity detector module 26 can measure the height of the objects in pixels, and then convert that image height into an estimate of the actual height of each foreground object 60 by reference to the range information for the object.

In one example, the ambiguity detector module 26 detects an ambiguity in a foreground object 60 (here, person 32) when the estimated height of the person 32 is larger than expected. For example, the pixel size of the person 32 is beyond a threshold value relative to the ground plane 40 and range from the surveillance camera 103. In another example, the ambiguity detector module 26 detects an ambiguity in a foreground object 60 when the estimated size of the object changes, as the foreground object 60 moves across the scene. If the ambiguity detector module 26 concludes that an ambiguity exists in one or more foreground objects 60, the method transitions to step 444. Otherwise, the method transitions back to step 440.

In step 444, the ambiguity detector module 26 refines/modifies the ground plane 40 to address errors in the ground plane suggested by the foreground objects found to have ambiguities. The ambiguity detector module 26 modifies the ground plane 40 using with reference to) the object tracking information 93, object classification information 94, and/or object size information 95 generated for the foreground objects 60 found to have ambiguities. The ground plane 40 can be considered to have 2 degrees of freedom along the X and Z axes.

In one example, the ambiguity detector module 26 can modify the ground plane 40 with reference to the bounding boxes and trajectory information of the foreground objects 60 found to have ambiguities. In examples, the ambiguity detector module 26 can move the ground plane up or down relative to its Y axis, or by rotating the ground plane 40 around its X and/or Z axes.

For example, if a bottom edge of the bounding box for a foreground object 60 is below the ground plane 40 for most of the trajectory of the object 60, the ground plane 40 might be moved down relative to its Y axis to be lower within the scene. The ground plane 40 is lowered until the front end 99 of the ground plane 40 matches/intersects with the bounding box's lower edge along the object's trajectory.

In another example, if the bounding box of a foreground object 60 is on or below the ground plane 40 for some part of the object's trajectory and above the ground plane 40 for the other part of the object's trajectory, the ambiguity detector module 26 might rotate the ground plane 40 around its X and/or Z axes to keep the object's bounding box on the ground plane 40 for the entire trajectory. The ambiguity detector module 26 uses bounding box size changes along the object's trajectory to determine whether to rotate the ground plane 40 around its X and/or Z axes.

Then, using the object classification information 94 and object size information 95 as a reference, the ambiguity detector module 26 can then estimate the mapping from pixel height to physical height of the objects 60. For this, the ambiguity detector module 26 assumes all persons to be of some fixed height. Once this mapping is obtained for a few points on the ground plane 40, the mapping for the rest of the points on the ground plane 40 can be generated without additional observations. More fine-grained object classification information 94 such as "man," "women," "child" etc. enables the mapping to be more accurate.

For modifying the ground plane 40, the ambiguity detector module 26 will not consider object tracking information 93 generated for some objects 60. For example, object detection and tracking systems 70 of video analytics systems 132 sometimes track false objects such as parts of trees. The ambiguity detector module 26 will not consider the object tracking information 93 generated for these false objects, and will also not consider tracking information other objects 60 which are far away from the ground plane 40.

Obtaining an accurate initial ground plane 40 from the baseline calibration module 24 is also a factor. An accurate initial ground plane 40 enables the ambiguity detector module 26 to most accurately determine ambiguities in foreground objects 60, and to most accurately modify the ground planes 40 to address the errors in the ground planes 40 suggested by the ambiguities found in the foreground objects 60.

Finally, in step 446, the ambiguity detector module 26 stores the modified ground plane 40 to the camera storage 44 record within the surveillance camera 103 and/or within the archive 110. Control then passes back to step 440.

Figure 7A:
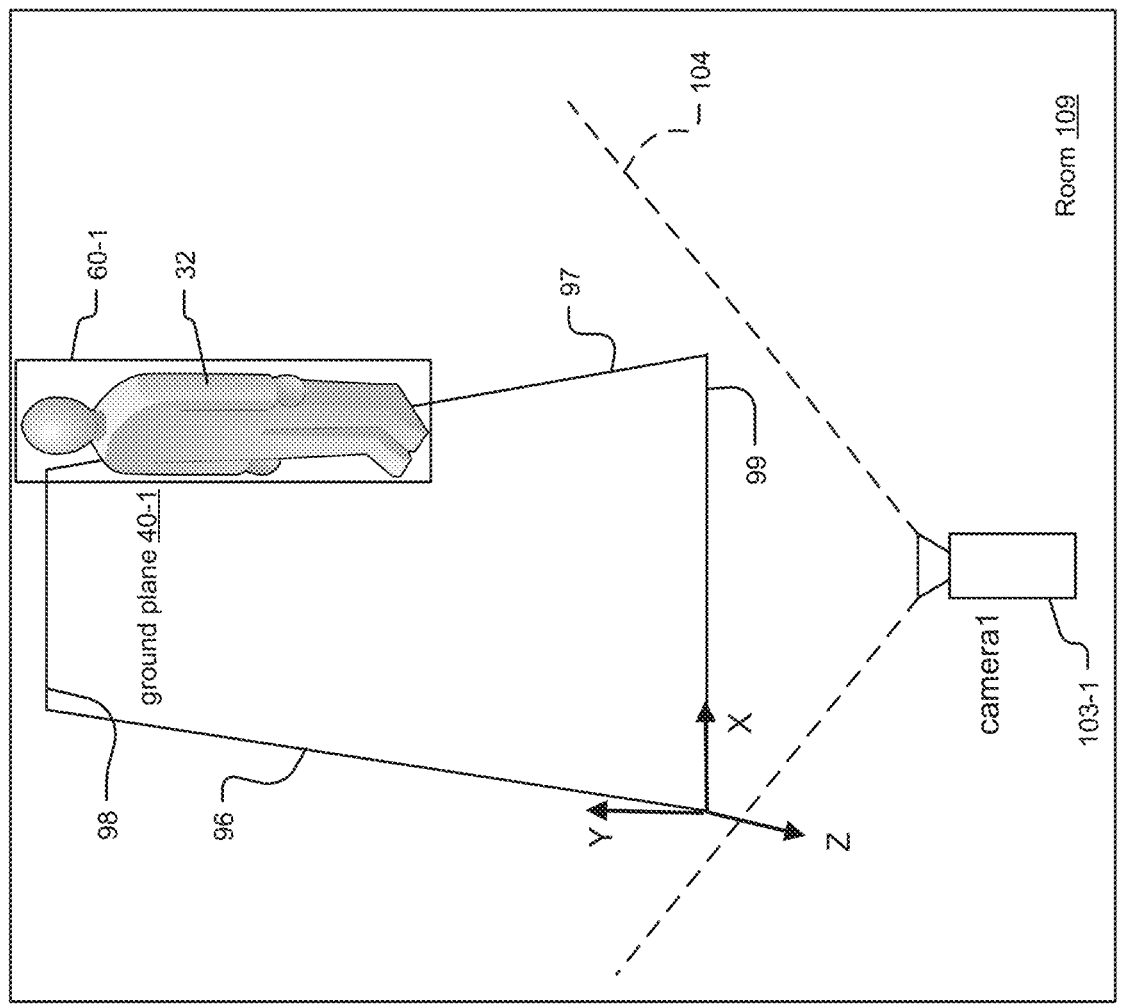
FIG. 7A-7D are schematic diagrams that illustrate different ambiguities in foreground objects relative to a ground plane.

FIG. 7A illustrates an ambiguity associated with a person 32 as the foreground object 60-1, where the estimated height of the person 32 is larger than expected. Person 32 is located partially within ground plane 40-1 within the scene. The person 32 is located near the back end 98 and the right edge 97 of the ground plane 40-1. The ambiguity detector module 26 can detect the ambiguity associated with the person 32, which suggests an error in the ground plane 40-1, and can address the error in the ground plane 40-1 as described below.

The ambiguity detector module 26 first determines whether an ambiguity associated with person 32 exists relative to the ground plane 40-1. For this purpose, the ambiguity detector module 26 uses the position of the foreground object 60-1 (here, person 32) on the ground plane 40 to determine the range of the person 32 and then calculates an estimated height of the person 32 from the person's height in pixels and the range. Then, the ambiguity detector module 26 compares the estimated height to an expected height for the class/type of foreground object 60. An expected height of a person is generally in the range from 3-6 feet (or 1-2 meters) tall. If the estimated height exceeds the expected height for one or more persons, such as when the estimated height of the person 32 is 9 feet (or 3 meters) tall, the ambiguity detector module 26 concludes an ambiguity in the foreground object 60 that may indicate errors in the ground plane 40.

The ambiguity detector module 26 then modifies the ground plane 40-1 to address the errors in the ground plane 40-1 suggested by the ambiguity in object 60-1. Here, the ambiguity (e.g. unexpected height of the person 32) is likely due to a ground plane 40-1 that is located too close to the picture plane within the scene. To address the error in the ground plane 40-1, the ambiguity detector module 26 compares the ground plane 40-1 against the tracking information 93 (e.g. bounding box/trajectory information) for the foreground object 60-1 having the ambiguity. Here, the ambiguity detector module 26 might rotate the ground plane 40 clockwise around its X axis and also rotate the ground plane 40-1 around its Z-axis. The ground plane 40-1 might rotate the ground plane 40-1 around its Z-axis more towards the picture plane.

Figure 7B:
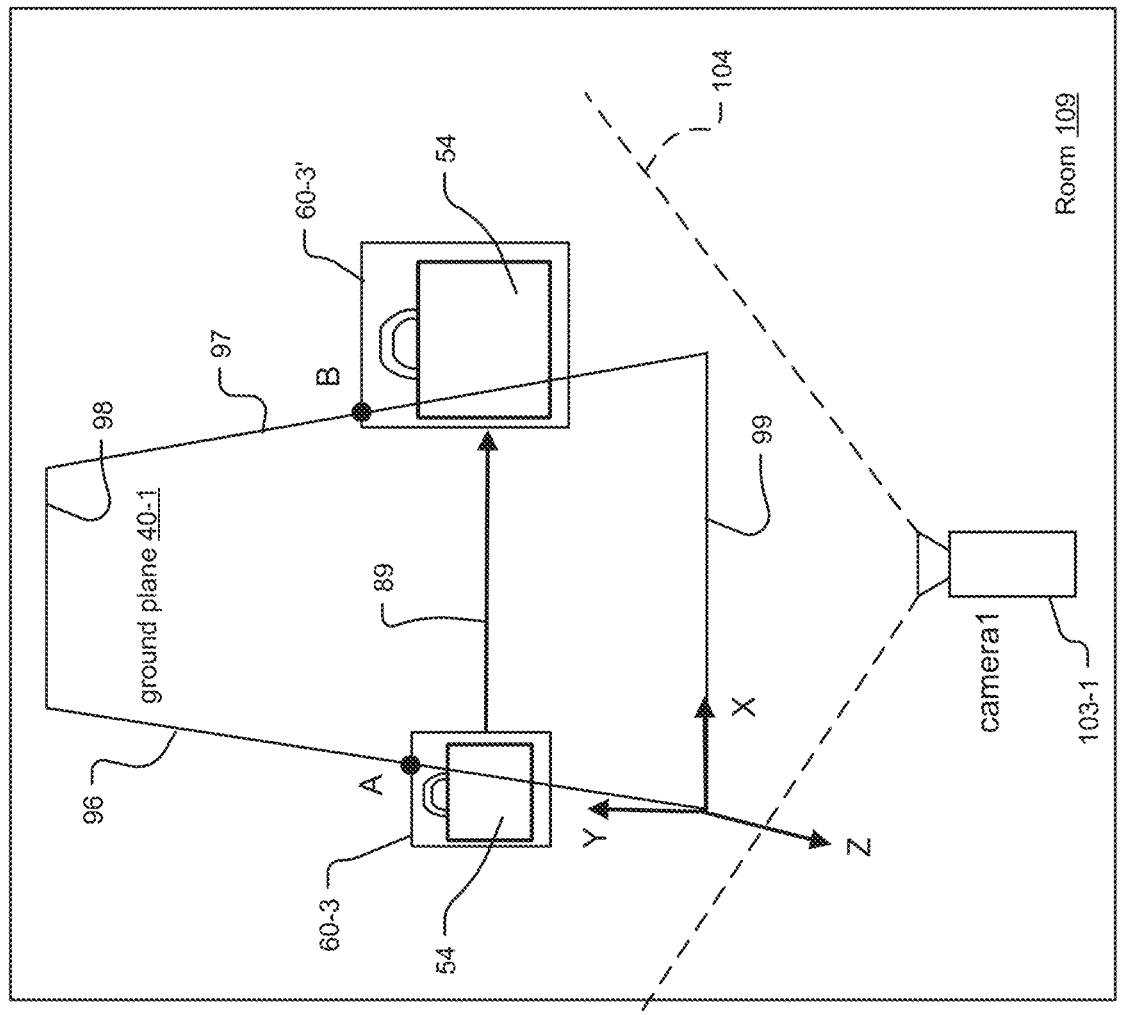

FIG. 7B illustrates an ambiguity associated with estimated size of a foreground object 60-3 (here, luggage 54) as the foreground object 60-3 moves across the scene. The foreground object 60-3 moves from left to right across the scene. The motion of the luggage 54 from the left edge 96 of the ground plane 40-1 towards the right edge 97 of the ground plane 40-1 is indicated by vector 89. The ambiguity detector module 26 detects the ambiguity associated with the foreground object 60-3/luggage 54, and modifies the ground plane 40-1 to address the error in the ground plane suggested by the ambiguity in foreground object 60-3/luggage 54 as described below.

The ambiguity detector module 26 first determines whether an ambiguity associated with luggage 54 exists relative to the ground plane 40-1, as the luggage 54 moves across the scene. For this purpose, the ambiguity detector module 26 uses the position of the luggage 54 at point A, on the left edge 96 of ground plane 40, to determine the range of the luggage 54. The ambiguity detector module 26 then estimates the height of the luggage 54 at point A from its range. As the luggage 54 moves across the scene, the ambiguity detector module 26 repeats this process at point B, on the right edge 97 of the ground plane 40-1, to estimate the size of the luggage 54 from its range at point B.

However, the estimated size of the luggage 54 at point B is much larger than the estimated size of the luggage 54 at point A. In more detail, the motion vector 89 indicates that the motion of the luggage 54 was substantially parallel to the front end 99 of the ground plane 40-1. Thus, the range of the luggage 54 as derived from the ground plane 40 did not change. And as a result, the estimated size of the luggage 54 at points A and B should have been substantially the same. Yet, the size of the luggage 54 in pixels did change with its movement. As a result, the ambiguity detector module 26 concludes an ambiguity in the foreground object 60-3 (here, luggage 54) that may indicate errors in the ground plane 40.

Then, the ambiguity detector module 26 might rotate the ground plane 40-1 around its X axis to address the error in the ground plane 40-1. With reference to the object tracking information 93 (i.e. the bounding box and trajectory information) for the luggage 54, the ambiguity detector module 26 would likely rotate the ground plane 40-1 around its Z axis in a clockwise direction.

Figure 7C:
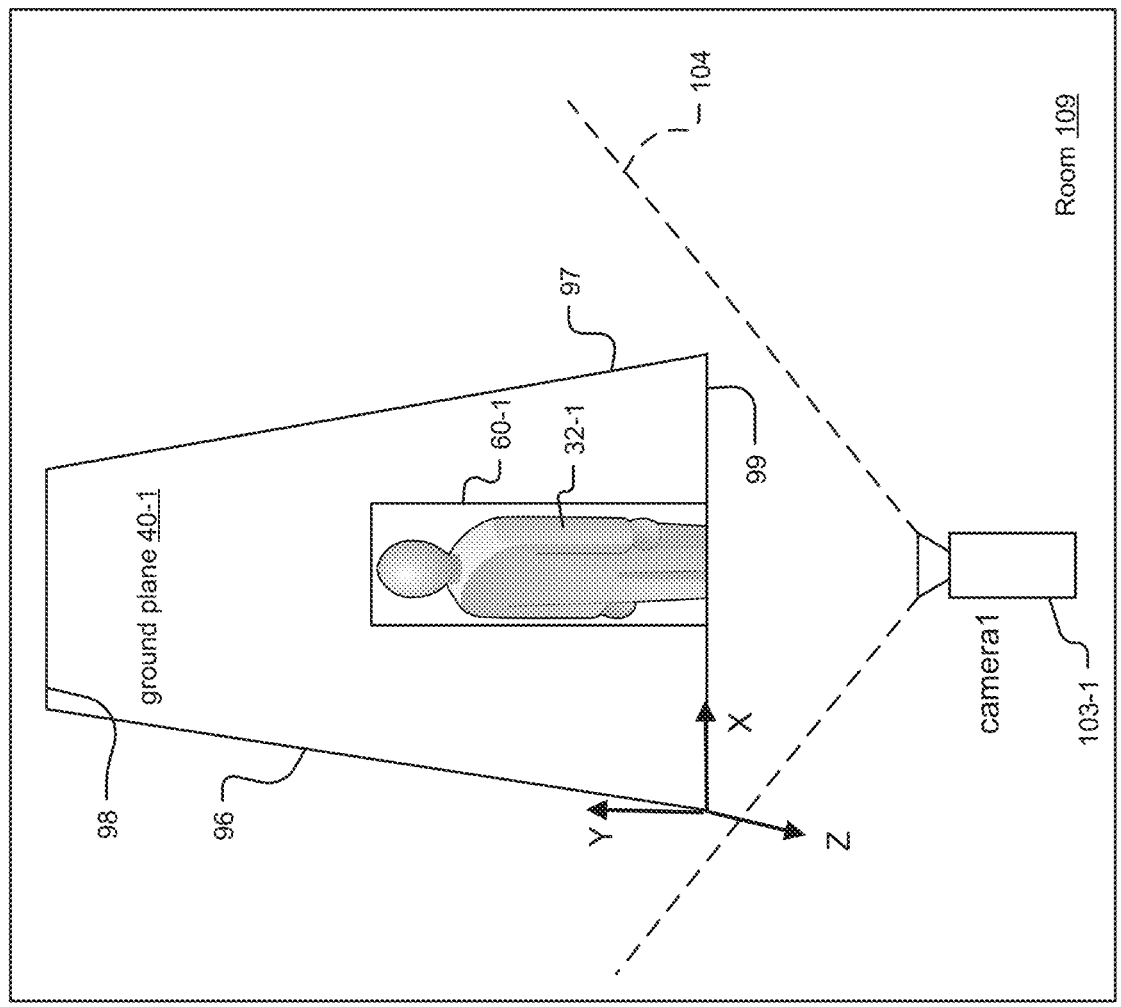

FIG. 7C shows another ambiguity in a foreground object 60-1. Here, a portion of a person 32-1 is missing or "cut off" with respect to a front end 99 of the ground plane 40-1.

The ambiguity detector module 26 first determines that an ambiguity associated with person 32-1 exists. The ambiguity detector module 26 obtains typical sizes for persons 32 from the object classification information 94 and object size information 95. The ambiguity detector module 26 then concludes that an ambiguity exists in foreground object 60-1 because the bounding box of the foreground object 60-1 (e.g. for person 32-1) is inconsistent with the typical sizes of persons 32.

The ambiguity detector module 26 can then address the error in the ground plane 40-1 suggested by the ambiguity in foreground object 60-1 by moving the ground plane 40-1 relative to its Y axis. Specifically, the ambiguity detector module 26 moves the ground plane 40-1 down its Y axis such that the front end 99 of the ground plane 40-1 is below the level of the bottom edge of the bounding box of foreground object 60-1.

Figure 7D:
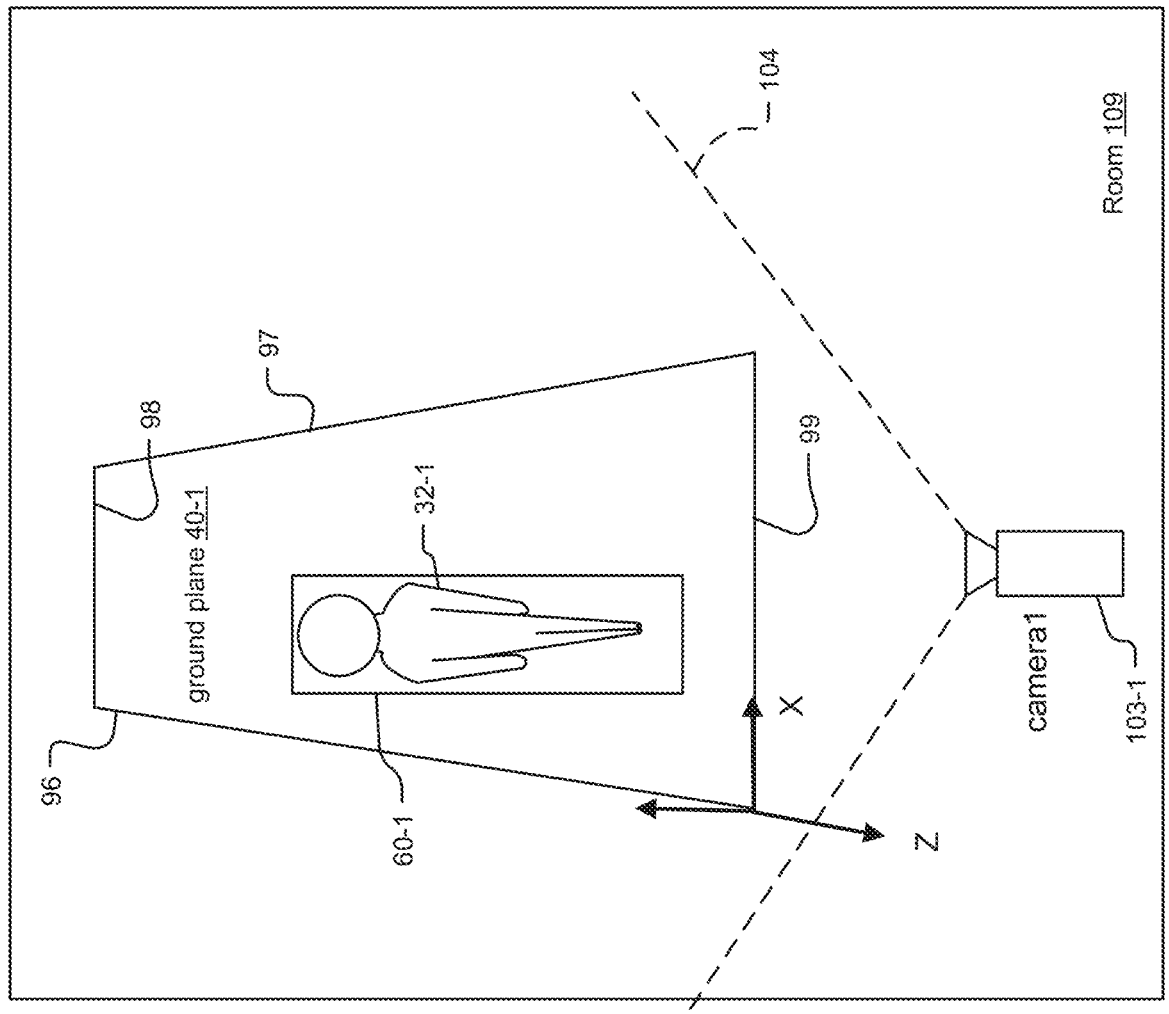

FIG. 7D shows yet another ambiguity in a foreground object 60-1. Here, a foreground object 60-1 for person 32-1 is located entirely within the ground plane 40-1, but appears to levitate above the ground plane 40-1.

The ambiguity detector module 26 determines that an ambiguity associated with foreground object 60-1/person 32-1 exists using analysis and methods described herein above. The ambiguity detector module 26 addresses the error in ground plane 40-1 suggested by the ambiguity in foreground object 60-1 by rotating the ground plane 40-1 around its X axis, such that the back end 99 of the ground plane 40-1 moves closer to the picture plane.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surveillance camera system, comprising:
   one or more surveillance cameras that capture images of scenes; and
   one or more calibration systems that automatically generate ground planes from the captured images from the surveillance camera;
   a video analytics system having an object detection and tracking system that tracks foreground objects within the scenes, wherein the object detection and tracking system generates object tracking information, object classification information, and/or object size information for each of the foreground objects;
   wherein the calibration systems determine whether ambiguities in the foreground objects exist relative to the ground planes, the ambiguities in the foreground objects suggesting errors in the ground planes, and wherein the calibration systems modify the ground planes to address the errors in the ground planes with reference to the object tracking information, object classification information, and/or object size information for the foreground objects found to have ambiguities.

2. The system of claim 1, wherein each of the calibration systems includes a calibrator module that automatically generates the ground planes from the captured images by:
   executing trained weights of a machine learning algorithm against one or more of the captured images to obtain depth images for the captured images, wherein the depth images estimate depth for pixels within the captured images; and
   creating the ground planes from the captured images and the depth images for the captured images.

3. The system of claim 1, wherein the one or more surveillance cameras include the one or more calibration systems.

4. The system of claim 1, wherein each of the calibration systems includes an ambiguity detector module that compares foreground objects against the ground planes to determine ranges and estimated heights or sizes of the foreground objects, and that detects ambiguities in the foreground objects that suggest errors in the ground planes based upon the ranges and the estimated heights or sizes of the foreground objects.

5. The system of claim 4, wherein the ambiguity detector module concludes ambiguities in the foreground objects when the estimated heights or sizes of the foreground objects change as the foreground objects move across the scene.

6. The system of claim 4, wherein the ambiguity detector module concludes ambiguities in the foreground objects when estimated heights of the foreground objects are determined to be larger or smaller than expected.

7. The system of claim 1, wherein the calibration systems modify the ground planes with reference to bounding boxes and trajectory information of the object tracking information for the foreground objects found to have ambiguities.

8. The system of claim 1, wherein the calibration systems modify the ground planes by moving the ground planes up and/or down relative to a Y axis of the ground planes.

9. The system of claim 1, wherein the calibration systems modify the ground planes by rotating the ground planes around an X and/or a Z axis of the ground planes.

10. A method for configuring a surveillance camera system, the method comprising:
one or more surveillance cameras capturing images of scenes;
automatically generating ground planes from the captured images from the surveillance cameras;
tracking foreground objects within the scenes;
generating object tracking information, object classification information, and/or object size information for each of the foreground objects;
determining whether ambiguities in the foreground objects exist relative to the ground planes, the ambiguities in the foreground objects suggesting errors in the ground planes; and
modifying the ground planes to address the errors in the ground planes with reference to the object tracking information, object classification information, and/or object size information for the foreground objects found to have ambiguities.

11. The method of claim 10, wherein automatically generating the ground planes from the captured images comprises:
executing trained weights of a machine learning algorithm against one or more of the captured images to obtain depth images for the captured images, wherein the depth images estimate depth of pixels within the captured images; and
creating the ground planes from the captured images and the depth images for the captured images.

12. The method of claim 11, further comprising training the machine learning algorithm with reference 2D image and corresponding ground truth depth image information, prior to executing the trained weights of the machine learning algorithm against the one or more of the captured images.

13. The method of claim 10, further comprising determining ambiguities in foreground objects relative to the ground planes.

14. The method of claim 13, wherein determining the ambiguities in the foreground objects relative to the ground planes comprises determining that estimated heights or sizes of the foreground objects have changed with movement of the foreground objects.

15. The method of claim 13, wherein determining the ambiguities in the foreground objects relative to the ground planes comprises determining that the estimated heights of the foreground objects are larger or smaller than expected.

16. The method of claim 10, further comprising the object tracking information including bounding boxes and trajectory information.

17. The method of claim 10, wherein modifying the ground planes comprises moving the ground planes up and/or down relative to a Y axis of the ground planes.

* * * * *